May 26, 1953     C. C. MISFELDT     2,639,876
MOLDED STRUCTURE
Filed Sept. 3, 1947     3 Sheets-Sheet 1
FIG.1
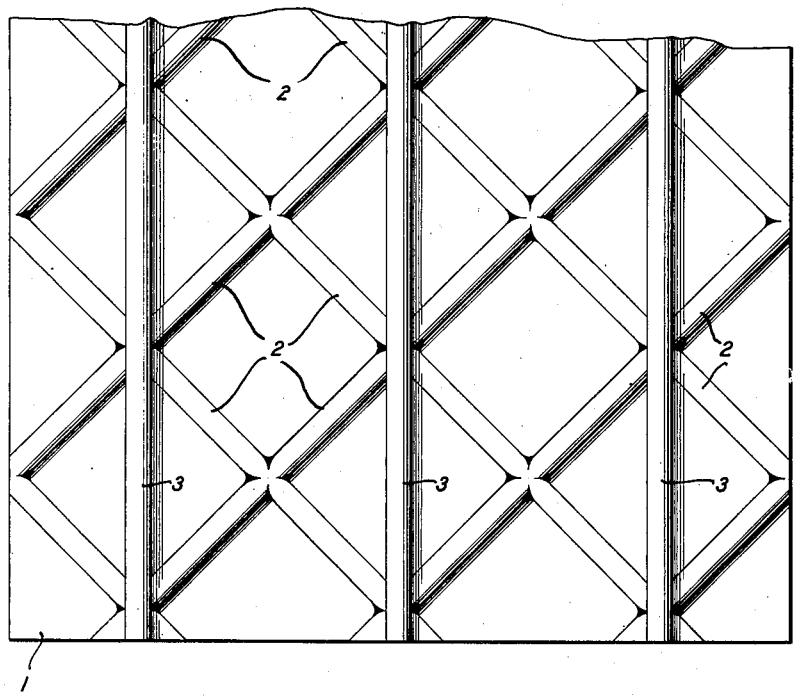
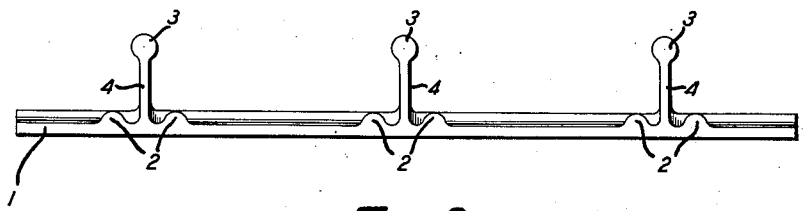
FIG.2
INVENTOR.
CHARLES C. MISFELDT
BY
HIS ATTORNEY.

May 26, 1953 — C. C. MISFELDT — 2,639,876
MOLDED STRUCTURE
Filed Sept. 3, 1947 — 3 Sheets-Sheet 2

INVENTOR.
CHARLES C. MISFELDT
HIS ATTORNEY

May 26, 1953  C. C. MISFELDT  2,639,876
MOLDED STRUCTURE

Filed Sept. 3, 1947  3 Sheets-Sheet 3

CHARLES G. MISFELDT
INVENTOR.

BY Donald K. Lippincott

HIS ATTORNEY

Patented May 26, 1953

2,639,876

UNITED STATES PATENT OFFICE 2,639,876

MOLDED STRUCTURE

Charles Clayton Misfeldt, Phoenix, Ariz.

Application September 3, 1947, Serial No. 771,846

7 Claims. (Cl. 244—124)

This invention relates to structural members of high strength and light weight, and particularly to monocoque members suitable for airfoils and other aircraft parts, marine structures, automotive parts and other analogous uses where maximum strength must be combined with minimum weight.

The severest requirements for the properties mentioned arise in connection with airfoils, and hence this specification will be directed more specifically to such structures and methods for forming them, but it will be obvious that structures which will meet the demands of such usage are also applicable to conditions where the requirements are less rigorous.

Among the objects of my invention are: to provide a method of forming structural elments of high strength-to-weight ratio and great rigidity; to provide structural members of exact contour, and which are not liable to local deformation under stress; to provide monocoque structural elements which are reinforced along geodesic lines without undue complexities of manufacture; to provide members which can be formed into structures of a minimum number of parts with correspondingly low manufacturing and maintenance costs; to provide members in which the principal stress bearing elements and all necessary reinforcement are integral; and to provide a method whereby the advantages of casting or other molding processes may be utilized in forming light, skin-stressed structures. Other objects and features of advantage may become apparent by reference to the ensuing description and the appended drawings, wherein:

Fig. 1 is a plan view of a test panel, such as is customarily used in predetermining the stress-strain characteristics of airfoils, made in accordance with my invention;

Fig. 2 is an elevation of the panel of Fig. 1, which shows the section thereof;

Figure 3:
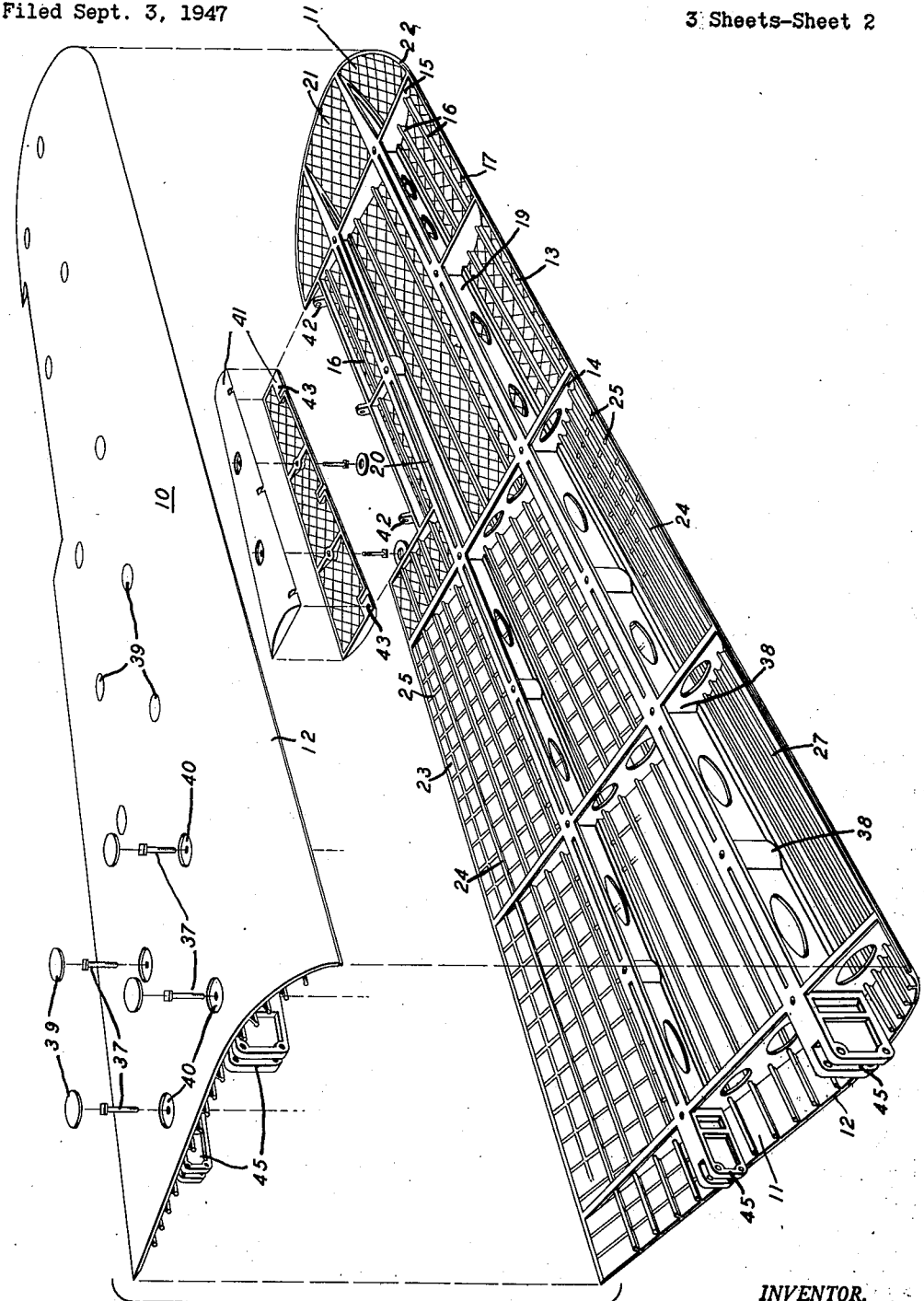
Fig. 3 is an exploded perspective view of an airplane wing, with flap and aileron, embodying my invention.
Figure 4:
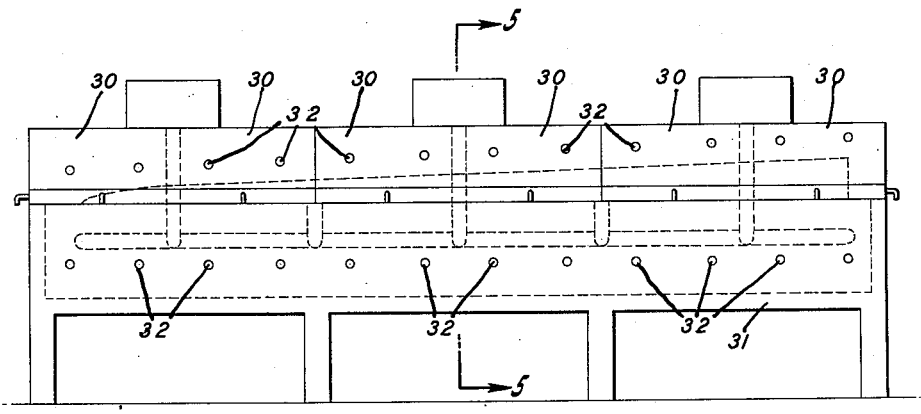
Fig. 4 is a drawing of a mold for forming structures of the type described.
Figure 5:
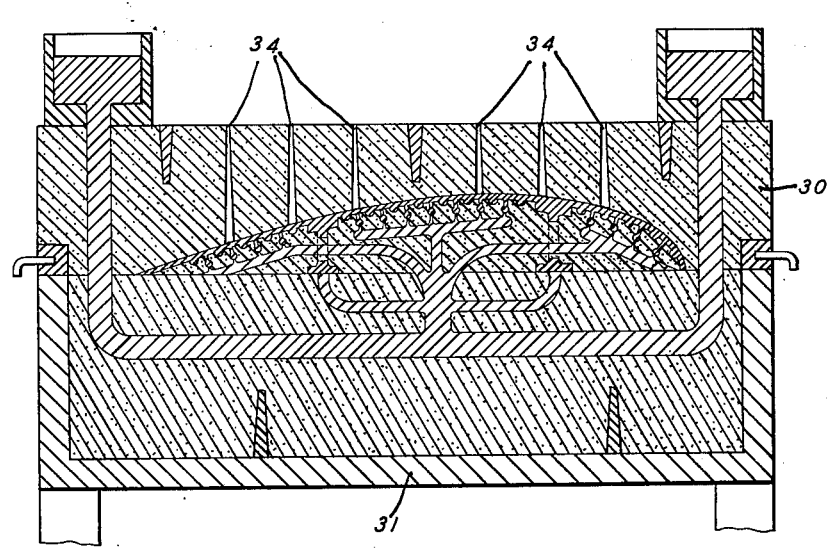
Fig. 5 is a cross-sectional view taken on the plane of the line 5—5 of Fig. 4.

Monocoque or stressed skin construction is widely used in modern aircraft. As so used it has been found necessary to modify the principle somewhat, for the thin skin, necessary for lightness, while capable of carrying all tensile stresses, is too flexible in itself to carry the compression, and therefore stiffeners are used for this purpose, and spars, ribs or both are provided to carry shear. The thin skin is fastened to these members by rivets or welding, and because of the small size and frailty of the parts, considered individually, this results in exceedingly complex structures, with thousands of rivets, or long welded seams, either of which cause local deformation of the perfectly smooth surface desired. Air pressure also can cause local deformation of the skin.

Such deformations tend to break up laminar flow of air and cause turbulence, which greatly increases skin friction from 30 fold to many times this value. Since this effect becomes more pronounced as speed increases, it becomes more and more important as aircraft are designed for the supersonic range of speeds.

In such designs every effort is made to secure rigidity both as regard resistance to local deformation and to major flexures. In accordance with my invention this rigidity and the equally important smooth, accurate contour are attained by casting or otherwise molding the structures in large sections, as, for example, the upper and lower halves of an entire wing.

That such a procedure has not been attempted in the past has been due to a number of factors: first, the great difficulty of obtaining uniform thin sections of large area by such processes, the metal chilling before the molds are filled. Second, cast structures are notoriously heavy (largely because of the factor first mentioned) and a high strength-to-weight ratio is a prime desideratum in airplane construction. A third reason can probably best be explained as a trend or fashion. Sheet metal construction, especially welded construction, has proved so valuable in lightening and strengthening many types of equipment, from electric motors to kitchen ranges, that it is the obvious engineering choice.

The product of my invention is a monocoque, modified in much the same degree as are the now conventional sheet metal structures. Broadly, the method of construction comprises forming a mold (which may be of dry sand, graphite, plaster or other composition, or of metal) for the skin, which is of such section as to carry the major portion of the tensile stresses. Intersecting channels are formed in the mold which divide the skin or plate into small areas and these channels are preferably arranged along geodesic lines of the surface and are so formed that when filled they constitute reinforcing elements of graduated size; first mere beads intersecting to form a net, then, in increasing size, stringers, ribs and, if necessary, spars, each set intersecting that of smaller size. Pencil-like risers are provided for the escape of air or other gases, the mold is heated, preferably electrically, to a degree but slightly below the fusing point of the alloy, and the molten metal is poured or injected through a gate or gates located at the largest of the reinforcing elements. After the mold is filled the temperature is reduced very gradually, which may be done either continuously or by steps, which prevents hot tears in the thin sections and results in a substantially normalized metal of uniform grain size. The mold can then be removed or collapsed, the gates and risers cut off and smoothed, and the result is a complete structural member, with all necessary reinforcement integral therewith.

This may be better understood by reference to Figs. 1 and 2, which illustrate a test panel, such as is customarily used in determining deflection and yield point coefficients for use in designing aircraft structures. This panel comprises a plate 1, corresponding to the skin of an airfoil.

The plate is reticulated by a series of intersecting diagonally disposed beads 2, which divide its inner surface into small areas; in this case squares of 4 inches on the diagonal, or about 2⅘ inches on a side. The beads are most effective if of semi-circular section, as shown, since this gives the maximum ratio of cross section to surface, but this form can be modified if desired without departure from the spirit of the invention.

Intersecting the beads, and preferably at their own intersections, is a series of larger reinforcing elements or stringers. In order to serve their dual purpose as filling channels and stiffeners for the final structure these are preferably of bulb-T section, comprising a bulb 3 and web 4. The web is filleted into the plate and the beads as indicated, which not only avoids stress concentrations but aids in pouring. For best results the beads make equal angles with the stringers, and the areas defined by them are approximately squares, although they may be rhomboidal if this gives a closer approximation to the geodesic lines of stress in the particular structure under consideration.

In a small member such as the panel just described the stringers are the largest reinforcing element used. Where a larger surface of greater total strength is to be constructed, e. g., a complete wing such as is shown in Fig. 3, the same principle can be carried forward through successively larger channel reinforcements.

In the latter figure, the reference characters 10 and 11 indicate generally the upper and lower halves respectively of a cantilever wing made in accordance with this invention.

In order to maintain a substantially uniform stress throughout the structure the skin 12 of each half tapers markedly from root to tip of the wing, and to a lesser degree from the axis to the leading and trailing edges. The section 13 of the lower half, inboard from the tip, is formed in substantially the same manner as the test panel first described, but is terminated by half ribs 14 and 15 which intersect the stringers substantially at right angles and in pouring serve as channels for filling stringers 16 and beads 17. The ribs, in turn, are intersected by spars 19 and 20, of still larger section.

Outboard of the section 13, the tip section 21 is but lightly stressed; here the stringers are omitted and the beads fill directly from the spar channels and from match bead 22 which surrounds the leading edge and tip.

Inboard of the section 13, in section 23 where the skin is thicker, the diagonal beads are unnecessary to secure complete filling of the skin section, which can be adequately accomplished through the stringers 24 and a single set of beads 25. Still further inboard, in section 27 where the skin is still thicker, the beads may be omitted entirely and the skin filled directly from the spars, ribs and stringers. It will thus be seen that the members in any portion of the graduated series from spars to beads may be omitted in accordance with the duty on the particular portion of the structure under consideration, but that such omission does not change the basic feature; i. e., the division of the relatively thin skin into elementary sub-areas by reinforcing members which act as filling channels, limit shrinkage, and, when the cooling is gradual, prevent tears.

The preferred material for a wing such as that shown is a magnesium base alloy of good flowing, strength and shrinkage characteristics. One such alloy is known commercially as "Flylite 5," the analysis of which is as follows:

| | Percent |
|---|---|
| Aluminum | 7.5 to 8.5 |
| Manganese | 0.2 to 0.4 |
| Zinc | 0.2 to 0.6 |
| Silicon | 0.0 to 0.3 |
| Copper | 0.0 to 0.05 |
| Nickel | 0.0 to 0.005 |
| Iron | 0.0 to 0.002 |
| Other components | None |
| Impurities | 0.03 |
| Magnesium | Remainder |

"Flylite 9" is a similar alloy having slightly more aluminum—from 9.2 to 9.8%—and a corresponding reduction in magnesium content. Other light alloys should be satisfactory for airplane construction, and for marine or automotive use, where extreme lightness is not so important, aluminum base alloys or bronzes can be used.

As has already been indicated, the mold can be of dry sand, graphite, plaster or metal. The preferred material for castings is graphite, because of its refractory and heat conducting properties, and because the molds can be made accurately to size and re-used. In castings of large area, such as a complete wing, the molds are made in sections 30 and accurately alined on a large flask-like table 31.

Heating elements 32 are inserted in the mold, and may either be molded in situ or inserted in cored holes. The type of heating element used is unimportant; many commercial types are available, and wound resistors, "Calrod" or induction elements are examples. If the molds are of metal or graphite they may themselves form the secondaries of induction transformers, in appropriate cases, and form their own heating elements, but this is not economical for large structures like a complete wing.

Prior to casting the wing of Fig. 3, the mold is brought up to a temperature of about 800° F. This should be done far enough in advance to insure substantial equalization of temperature throughout the mold. When the method is used on bronze castings, instead of magnesium or aluminum alloys, the temperature should be higher, from 1000° to 1200°, depending on the alloy.

The casting is poured in the usual manner;

the gases escaping from the mold through the vents provided by the risers 34. After the pouring, the temperature is gradually reduced, either by rheostat or similar control, by cutting certain of the heating elements out of the circuit, by changing from parallel, to series-parallel, to series connection, or by a combination of these methods, thus normalizing the casting and giving maximum strength at the yield point. When the temperature has been reduced to a point where no further changes in crystalline structure occur the sections of the mold can be removed or collapsed, and the casting trimmed and machined where necessary.

The upper and lower halves of the wing of Fig. 3 are fastened together with bolts 37, which pass through bosses 38 formed in the spars and ribs. The heads of the bolts are concealed and the wing surface smoothed by cover plates 39 fitted into countersinks 40.

Ailerons 41 for the wing described can be fabricated in the same manner as the wing itself. The hinge elements 42 on the wing and 43 on the aileron are cast integrally with the structures to which they are attached, the aileron halves being clamped together over pins preinserted in the hinge members 42. The attachments 45 to the body of the plane are also integrally cast.

It is not to be inferred that every molded wing would embody all of the features of the one just described, which was chosen for illustration primarily because it embodies more variants of the fundamental principles than most. In some cases the diagonal bead structure of section 13 will extend over the entire wing; in others the wholly rectangular arrangement of section 23 may be used throughout.

Somewhat surprisingly, the products of my invention are found to be particularly advantageous in ailerons, tail and rudder assemblies, etc., where past practice has used the lightest construction. This is because the very thin and flimsy sheet metal surfaces are especially difficult to hold to exact contour, and are particularly difficult to restrain against deformation in applying stiffeners, which of themselves are so small and frail as to be hard to handle. Diagonal bracing, especially advantageous in such cases, is almost impossible to apply, but by this method it becomes easy, and the castings, which would ordinarily be dismissed from consideration as intrinsically too heavy, actually prove to be the lightest structure of the requisite shape and strength.

As should be apparent from the foregoing, I do not wish to be limited to the specific embodiments of my invention as illustrated herein, but desire to protect the invention as broadly set forth in the following claims.

I claim:

1. An airfoil structure comprising a pair of complementary members, each of said members being a homogeneous structure of light metal comprising a plate forming the lifting surface of said airfoil, and a plurality of intersecting reinforcing elements of consecutively decreasing dimension subdividing said plate internally of the airfoil into areas approximately proportional to the thickness thereof.

2. An airfoil structure in accordance with claim 1 wherein reinforcing elements of the two members meet in the median surface between said members to form a girder.

3. A monocoque structural member comprising a metal plate tapering in thickness from root to tip, and successive intersecting reinforcing elements formed integrally with said plate and dividing the same into successively smaller areas as the thickness of the plate decreases, the number of reinforcing elements increasing and their size decreasing as the tip is approached.

4. A structural element in accordance with claim 3 wherein said reinforcing elements are arranged substantially along geodesic lines of the surface of said plate.

5. A monocoque structural member comprising a metal plate tapered in thickness and having a thickness which is small compared to its surface dimensions, a plurality of reinforcing beads formed integrally with the metal plate and mutually intersecting to divide the plate into relatively small surface units, a reinforcing rib also formed integrally with the beads and plate and intersecting a plurality of beads and tapered in thickness and said ribs are tapered in dimension concordantly with the taper of the plate, the said rib and beads being mutually proportioned with respect to the plate so that each successively forms a pouring passage to fill the mold in which the members are formed, in addition to its reinforcing function.

6. A monocoque structural member comprising a tapered metal plate having a thickness which is small compared to its surface dimensions, successive intersecting reinforcing elements formed integrally with the plate on one side thereof and dividing the same into successively smaller areas as the thickness of the plate decreases, the number of reinforcing elements increasing as their size decreases toward that end of the plate having minimum thickness, the other side of the plate being substantially smooth.

7. A monocoque airfoil structural member comprising a metal plate tapering in thickness from root to tip, and successively intersecting reinforcing elements formed integrally with the plate on one side thereof, and dividing the plate into successively smaller areas as the thickness of the plate decreases toward its tip, the number of reinforcing elements increasing and their size decreasing as the tip is approached, the opposed side of the plate forming a smoothly curved surface.

CHARLES CLAYTON MISFELDT.

References Cited in the file of this patent

UNITED STATES PATENTS

| Number | Name | Date |
|---|---|---|
| 1,097,848 | Custer | May 26, 1914 |
| 1,272,062 | Lake | July 9, 1918 |
| 1,531,445 | Lake | Mar. 31, 1925 |
| 1,576,317 | Eklind | Mar. 9, 1926 |
| 1,671,253 | Parsons et al. | May 29, 1928 |
| 1,854,330 | Delage | Apr. 19, 1932 |
| 2,225,779 | Hart-Sill | Dec. 24, 1940 |
| 2,230,393 | Thomson | Feb. 4, 1941 |
| 2,256,234 | Best | Sept. 16, 1941 |
| 2,371,754 | Gillum et al. | Mar. 20, 1945 |
| 2,458,686 | Davie | Jan. 11, 1949 |

FOREIGN PATENTS

| Number | Country | Date |
|---|---|---|
| 559,954 | Great Britain | Mar. 13, 1944 |